INVENTOR
ALAN J. BLAYNEY

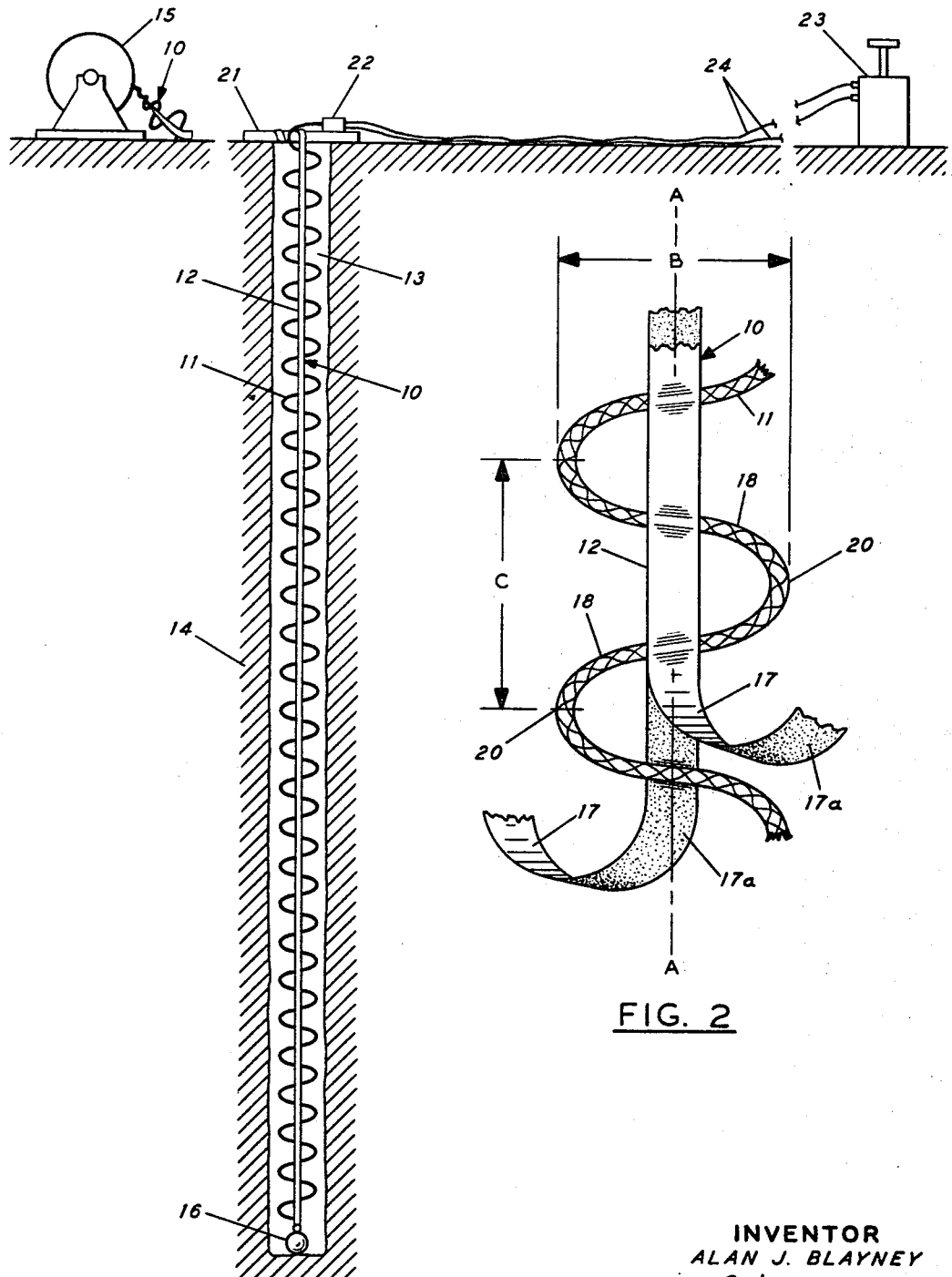

United States Patent Office 3,388,628
Patented June 18, 1968

3,388,628
SEISMIC SOURCE, METHOD AND APPARATUS
FOR FORMING SAME
Alan J. Blayney, Calgary, Alberta, Canada, assignor to Chevron Research Company, a corporation of Delaware
Original application Jan. 8, 1965, Ser. No. 424,305, now Patent No. 3,323,611, dated June 6, 1967. Divided and this application Sept. 26, 1966, Ser. No. 598,533
8 Claims. (Cl. 86—1)

ABSTRACT OF THE DISCLOSURE

A method and apparatus for forming a sinusoidally patterned seismic source for generating velocity controlled artificial seismic waves in an earth formation, the source being formed using a pair of rollers in tangential line contact with each other for advancing an unconformed length of explosive material therebetween and oscillating means for varying the point of first contact between the pair of rollers and the explosive material so as to thereby form a sinusoidal pattern along the explosive material. A pair of adhesive tapes are positioned in operative contact with the pair of rollers, being so located on the pair of rollers so as to continuously unite in touching relationship with either each other or the formed explosive so as to permanently maintain the explosive in a sinusoidal shape.

This is a division of application Ser. No. 424,305, filed Jan. 8, 1965, now Patent No. 3,323,611.

This invention relates to geophysical surveying by the seismic wave reflection and refraction methods, and is directed particularly to an improved form of a seismic source for generating artificial seismic waves for such surveying.

Among the objects of the present invention are:

(1) To provide a low-cost seismic source in which a linear length of explosive material is held in a sinusoidal or zig-zag pattern by means of a central support extending along the axis of symmetry of the source and attaching to the explosive at its intersection with the above-mentioned axis of symmetry, and (2) To provide a novel method and apparatus for forming a seismic source of the above-described type.

While the seismic method of geophysical prospecting has been generally successful, there are areas of interest where the method is limited owing to problems related to (a) coupling the seismic wave generated by the seismic source into the adjacent earth formation, and (b) attenuation of the after-coupled seismic signal by discontinuities in the formation.

It has been proposed to use linear explosives in various forms in an effort to increase the magnitude of the signal generated by the seismic source to overcome these difficulties. Such linear explosives may be used in various forms such as a continuous length of linear explosive material which is progressively detonated. The linear explosive material is so arranged that the component of the detonation velocity in the direction of the vertical axis of the charge is equal to the propagation velocity of the seismic wave in the surrounding medium. Consequently as the charge is detonated, the seismic wave generated in the surrounding medium is reinforced throughout the length of the charge maximizing the energy transfer from the explosive to the medium.

In one form of seismic source now used in seismic surveying, the length of explosive material is wound in the form of a helix whose pitch is adjusted to produce a desired vertical component to detonation. Such charges are usually formed by winding the material in the field on a suitable support such as a wooden pole, and then inserting the source into the shot hole. However these steps are time-consuming to perform requiring the aid of special winding fixtures, usually manually operative, to form the explosive in the desired pattern. Consequently, the efficiency of a seismic crew as measured by the total time required to set up, shoot and obtain a time-space record of the reflected seismic waves, is correspondingly limited.

In another form of prior art explosive, the length of explosive material is coiled or preformed into a compressed condition for easy insertion into the shot hole, and then the explosive material is expanded upward toward the earth's surface to either a helical or sinusoidal form to produce the desired vertical detonation component. The charge may include coextensive supports having predetermined lengths to limit the amount of expansion of the charge. But both the charge and support are packed in compressed form in a cylindrical canister for protection of the charge during insertion into the shot hole. Consequently this form of explosive has been found to be rather time-consuming and expensive to produce requiring rather heavy forming machines to wind the charge and support in the desired pattern. Consequently to be assured of an adequate supply during prolonged field tests, a seismic crew may be required to field-stock a number of different sized support members and explosive charges with their regular seismic equipment. Furthermore there may be some difficulty in loading the shot hole since the construction of the canister requires that the shot hole be at least as wide as the canister throughout the length of the shot hole.

Briefly, the present invention contemplates a novel form for the seismic source and includes a method and apparatus for forming the source for the purpose of overcoming the aforesaid difficulties. The invention is based on the discovery that a length of linear explosive material having a permanently formed sinusoidal or zig-zag pattern can be fabricated in the field for land or marine surveying by the incorporation of a support extending throughout the length of the explosive but gripping the latter only over a central portion thereof.

In one aspect of the invention, the length of explosive material is formed into a sinusoidal pattern having adjacent loops held fast by means of a pair of adhesive strips having their gummed sides in contact with one another between the loops of the explosive and in contact with the loops at the axis of symmetry of the explosive. In that manner, the unsecured portions of the loops are free to differentially expand or contract relative to the adhesive strips without stress build-up in the loops or the strips. In a similar manner, the rate of detonation of the source can also be matched to the propagation velocity of a damped propagative medium surrounding the explosive by stepped, uniform or exponential variation of the rate of change of the amplitude of the sinusoidal pattern of the assembled explosive.

In another aspect of the invention the length of linear explosive material is formed into the aforesaid sinusoidal or zig-zag pattern by means of a portable forming apparatus comprising a pair of rotating rubber rollers located adjacent to a reciprocating bar. The bar varies the point of first contact between the explosive material and the rubber rollers over a segment of the rollers in accordance with the stroke of the bar. The rollers grip the explosive and cause advancement at a speed directly related to the frequency of oscillation of the bar. The combined operation of the rollers and bar forms a sinusoidal pattern in the explosive at the output of the rollers. Twin adhesive tapes are simultaneously attached on opposed sides of the loops at the rollers thus effectively sealing the explosive in the desired sinusoidal pattern.

Other objects and features of the invention will become more apparent from the following description of a preferred embodiment of the invention in which:

FIGURE 1 is a side elevational view of a length of linear explosive material formed and supported in a sinusoidal or zig-zag manner to form a seismic source in accordance with the invention;

FIGURE 2 is an enlarged view of a portion of the seismic source of FIGURE 1.

Figure 3:
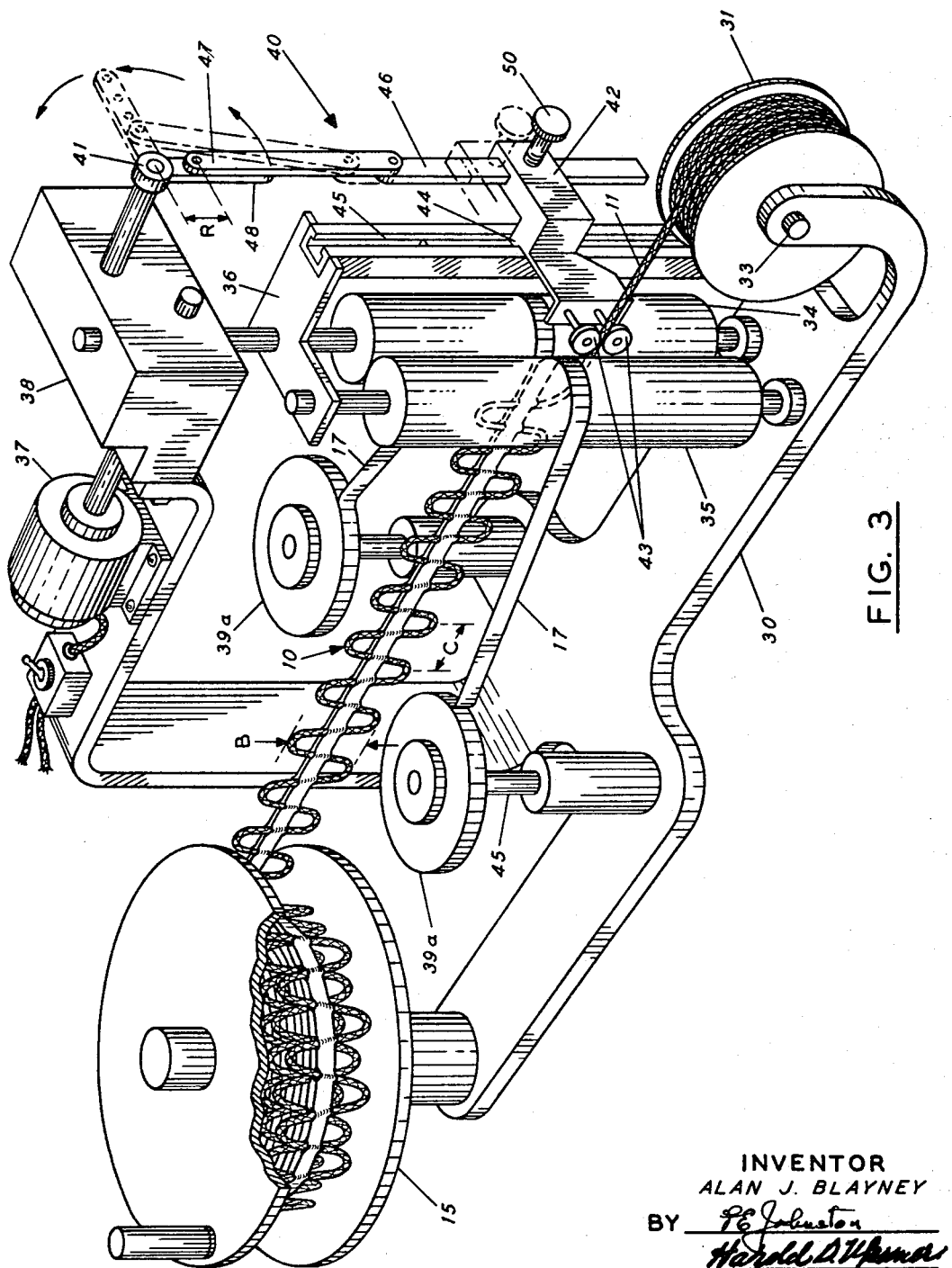
FIGURE 3 is a prospective view of an apparatus for forming the source of FIGURES 1 and 2.

In preferred applications, the propagative characteristics of the medium adjacent to the seismic source are such that coupling the generated seismic wave into the propagative medium, may be difficult, and/or the after-coupled seismic signal may be significantly attenuated during travel through the medium.

In order to increase the amplitude of the generated seismic wave relative to the noise level of the propagative medium, a seismic source 10 of FIGURE 1 formed in accordance with the invention is preferably formed of a length of explosive material 11 held in a sinusoidal or zig-zag pattern by a central support 12. The support extends along the axis of the formed explosive in periodic contact therewith, but the peaks of the explosive are unsupported in order to be free to expand or contract relative to the support.

In this application, the length of explosive material 11 may be commercially known under the trademark "Primacord," a detonating cord containing, for example, 100% of PETN or RDX. PETN is an abbreviation for the compound pentaerythrite tetranitrate. RDX may be, for example, 98% cyclonite and 2% wax, cyclonite being an abbreviation for the chemical composition cyclotrimethylene trinitramine. Another detonating means of similar properties may of course be used without departing from the scope of the invention.

In utilizing the seismic source in accordance with the invention, the source may be lowered into a shot hole 13 penetrating an earth formation 14 by means of drum 15 located at the earth's surface around which the source is wrapped. Weight 16 is located at the lower end of the central support 12 to increase the relative weight of the source and aid its downward travel through the shot hole. The support 12 is sufficiently strong to support both the weight 16 and the explosive 11, and preferably comprises adhesive strips or tapes 17 having aligned and mated gummed surfaces 17a, see FIGURE 2. It contacts the explosive only over a central region however as previously mentioned, namely, where loops 18 intersect axis of symmetry A of the source. In this region, the gummed surfaces 17a are squeezed together to form a double tape between each loop but at the base of loops, i.e., at the intersection of the loops with the axis A, these surfaces attach to opposed sides of the explosive as illustrated.

The adhesive tapes 17 may be of conventional commercial adhesive materials, and a preferred form includes glass fibers to add strength. The widths of the tapes are preferably equal and in any event are substantially less than the amplitude B, see FIGURE 2, of the source. Otherwise the loops may not be free to differentially expand or contract as previously explained.

Each tape may be formed in a variety of cross-sectional configurations but a rectangular cross-sectional configuration is preferred to allow bending parallel to their broad surfaces for drum storage of the finished source.

In a preferred embodiment of the invention, the peaks 20 of each loop 18 are equally spaced above and below the axis of the charge. Consequently, the maximum amplitude B of FIGURE 2 is constant throughout the length of the source. I.E., an imaginary envelope superimposed on the formed source defines an amplitude of constant magnitude. Furthermore peak-to-peak spacing C of the source is also preferably uniform so that the total length of the explosive is an even multiple of the aforesaid spacing.

As the source descends through the shot hole, debris may infiltrate a section of the shot hole, but the source 10 and weight 16 usually find passage through the obstruction inasmuch as their dimensions are much reduced over those of conventional seismic sources.

At the desired level in the shot hole, usually the bottom, the upper end of the source is severed and attached to a support strut 21 located across the shot hole at the surface of the earth. Attachment may follow many forms as for example the upper end of the central support 12 may be wound about a portion of the support strut and tape applied to the wound portion. To complete the detonation circuit, the upper end of the explosive material 11 is attached to conventional blasting cap 22, and plunger 23 connects to the cap through electrical conductors 24.

If considerable noise is generated by the source 10, the matching of the detonation rate to the propagation of the artificial seismic wave within the adjacent earth formation may require variation to other than the usual sinusoidal pattern of the seismic source. Such applications may involve earth formations having a high degree of discontinuities at the near surface that tend to scatter and absorb the seismic wave in a nonlinear manner.

Consequently in order to effectively match the detonation rate with the sonic velocity of the formation, the amplitude B of the source (the distance between peaks of adjacent loops) may have to be changed by either uniform, stepped or exponential increments along the length of the source. That is to say, the source is modified so that an imaginary envelope superimposed upon the formed length of exposive and interrupting each peak only, defines an amplitude that changes in either a uniform, stepped or exponential manner with respect to distance along the source. In addition, it is to be noted that in this application, the term "stepped increment" refers to a modified sinusoidal patterned source in which the amplitude of the above-mentioned envelope abruptly changes at predetermined intervals along the length of the source, but remains a constant value between such steps. In a similar but alternate construction, the spacing C between adjacent peaks also may be changed along the length of the source in similar fashion.

The upper limit of possible variation of the amplitude B of the source relates to the propagation medium adjacent to the explosive. In land operations, the upper limit of variation is the diameter of the shot hole, but in the other application where the invention is useful, namely, marine exploration, the upper range of the amplitude is only limited by the size of source that can be conveniently transported and stored aboard the seismic boat or raft.

It will be noted that inasmuch as unduly sharp bends between adjacent loops of the source may cause detonation across the loops rather than along them, there is a preference in practice in changing the aforesaid sinusoidal pattern by varying the rate of change of amplitude B of the pattern relative to length, rather than by varying the spacing C between adjacent peaks.

A seismic source having a detonation rate from 12,000 to 16,000 feet per second has been successfully constructed and had the following dimensions.

| Element: | Dimensions |
|---|---|
| Charge 11 (Primarcord)— | |
|    Amplitude B | 1.7 inches (constant). |
|    Spacing C | 2½ inches (constant). |
|    Length | 100 feet. |
| Support 12— | |
|    Width | ¾ inch. |
|    Material | Nylon with impregnated glass fibers. |

An apparatus for forming a sinusoidal patterned seismic source in accordance with the invention and having the advantages of compactness, portability and ease of operation is illustrated in FIGURE 3. The apparatus includes a base 30 supporting a spool 31 of unconformed explosive material 11 (material not yet formed into a sinusoidal pattern) and a take-up drum 15 on which the finished sinusoidal form of the source is wound. Spool 31 is free to rotate about shaft 33. The explosive material 11 moves into contact with the take-up drum 15 through rollers 34 and 35 located between the spool and drum.

The advancement of explosive relative to the base 30 is not provided by the take-up drum as in conventional systems but by the rollers 33 and 34. They are located in tangential contact with each other along an axis normal to the direction of advancement of the charge, and have their ends journalled on base 30 and support 36 above the base. The shaft of roller 34 extends through the support 36 and connects with motor 37 through gearbox 38. However the roller 35 is not directly connected to the motor but operates only through surface contact with roller 34 along the tangential axis mentioned above.

As the explosive unwinds from spool 31, say at half a foot per second, the relative location of successive portions of advancing charge are dynamically altered prior to passing into contact rollers 34 and 35. The movement of the advancing charge is accomplished by means of a feed mechanism generally indicated at 40 in FIGURE 3. The feed mechanism includes a crank 41 connected to motor 37 through the gearbox 38 and a reciprocating bar 42 for guiding the explosive into contact with the rollers. As illustrated, the rotational motion of crank 41 in the direction shown is converted to reciprocating motion of the bar 42. Inasmuch as bar 42 is in direct attachment with the advancing charge, successive portions of the charge are displaced along in the surface of contact of the rollers in accordance with the movement of the bar.

Adhesive strips or tapes 17 unwind from dispensers 39a and 39b on the base of the apparatus and attach to the charge at the intersection of respective surfaces of the rollers. These dispensers are located forward of the rollers (between the take-up drum and the rollers) to prevent the tapes from contacting the oscillating bar 42 as the explosive advances through the rollers.

The axis of rotation of the dispensers are parallel to those of the rollers but are not positively driven as are the latter but depend upon the rotation of the rollers for movement. In operation each adhesive tape unwinds from its despenser and initially contacts the roller with the nonadhesive side facing the rubber surface. As the tapes advance about the roller, they reverse direction relative to the direction of movement of the explosive material so that their adhesive sides are either squeezed together to form a double tape between the loops of the sinusoidal patterned source or contact opposed sides of the source at the base of the loops.

Not only do the rollers cause the tapes to be attached together between the loops and attach to the charge itself, but also the rollers hold each loop after one end is secured to the tapes but before the tapes are secured to the other end. Consequently, as the charge advances toward the take-up drum 15, the speed of the rollers must be timed with the stroke of the oscillating bar 42. Otherwise the bar may form a loop along the explosive before the ends of the prior formed loop are firmly attached to the tapes. For setting and adjusting the speeds of the rollers and the bar 42 for this purpose, the motor 37 may be connected to roller 34 and the crank 41 through a differential located in the gearbox 38.

The oscillating bar may take a variety of configurations as for example that configuration which includes guide wheels 43 to guide the unstressed charge into contact with the rollers, a central boss 44 for keying the bar 42 to guide member 45 to fix the longitudinal distance between these elements, and vertical linking member 46 connected to crank member 47 to aid in the conversion of rotary movement of the crank to reciprocating motion of the bar 42.

The relative dimensions of the sinusoidal pattern charge are variable by adjusting either the cycling period of the apparatus (changing the spacing C between adjacent loops of the finished source) or by adjusting the stroke of the oscillating bar 42 (changing the amplitude B across the loops). However as previously mentioned there is a preference to varying the usual sinusoidal pattern by the latter method to avoid producing sharp bends between the loops.

These adjustments may be performed at given intervals during formation of the source and involve stopping the apparatus to change the crank radius R between the crank shaft and the attachment of crank arm to linking member 47. It is also to be noted that the adjustments can also be performed in a dynamic manner involving modification of the apparatus illustrated in FIGURE 3. More particularly, in the modified arrangement, the crank 41 is modified to include an extension attached to crank arm 48 at the end remote from the crank shaft. The extension may include a hollow housing in which are located windings of a solenoid connected to a generator through conductors passing through the crank shaft. The crank arm 48 is also modified to include a hollow portion aligned with the hollow portion of the extension, and including a metal plunger extending through both members. At the portion of the arm 48 having a plurality of openings, as illustrated in FIGURE 3, there is located a slot through which an end of the solenoid plunger bent at right angles to the crank arm extends for contact with linking member 47. A rotating coupling is used for connecting these elements. Consequently as a signal current flows through the windings from the generator, there is a displacement of the plunger relative to the crank shaft that can either periodically, uniformly or exponentially displace the crank member 47 a given distance from the crank shaft to alter the stroke of the bar 42.

It is to be noted that simultaneous with adjustments in the apparatus to provide variations in the sinusoidal pattern of the charge, the mid-point of the stroke of the bar 42 must also be varied to align the former with the adhesive tapes on the rollers 34 and 35. Otherwise the tapes would no longer intersect the formed explosive along its axis of symmetry. For this purpose, set screw 50 is releasably held relative to bar 42 for connection with linking member 46. It is adjustable to provide increase or decrease in the height of the member 46 above bar 42 as the crank radius is changed. Such adjustments may also be automated, if desired, to include a magnetic lock controlled by a solenoid connected parallel with the system described above. Consequently the signal that varies the crank radius along a predetermined program also causes displacement of the linking member 46 relative to bar 42 to automatically align the bar with the tapes on the rollers.

What is claimed is.

1. An apparatus for forming a linear seismic source for generating artificial seismic waves in an earth formation wherein the detonation rate of said source is matched to the seismic velocity of said formation, said source including a sinusoidal patterned length of explosive material formed from an unconformed length of said material, comprising:

(a) a pair of rollers in tangential line contact with each other, (b) means for driving at least one of said rollers in rotation for advancing said unconformed length of said explosive material in a first direction intersecting said tangential line of contact between said pair of rollers, (c) means for oscillating the point of first contact between said pair of rollers and said unconformed explosive material along said tangential line of contact both at a frequency directly related to the speed of advancement of said unconformed explosive and in a direction substantially normal to said first direction so as to thereby form a sinusoidal pattern therealong, as said unconformed explosive passes between said pair of rollers, (d) a pair of tape dispenser means each fitted with adhesive tape adapted to operatively contact said pair of rollers for movement therealong, and (e) surface means on said pair of rollers for attaching said sinusoidally patterned explosive between said pair of adhesive tapes at said tangential line of contact of said rollers whereby the gummed sides of said tapes are fused in aligned relationship with each other and with said formed explosive to maintain said formed explosive in said sinusoidal pattern.

2. The apparatus in accordance with claim 1 in which said second-mentioned means includes a rotating crank and a slidable bar, said rotating crank in operative contact with said bar to provide an oscillatory movement thereto in said second direction substantially normal to said first direction, said bar in operative contact with a portion of said unconformed length of explosive to provide correlative movement thereto.

3. The apparatus of claim 1 in which said second-mentioned means includes separate means for adjusting the amplitude of said oscillations of said unconformed explosive.

4. A method for continuously conforming a linear directional seismic source comprising a length of explosive material formed into a sinusoidal pattern from an unconformed length of such material, comprising the steps of:

(a) advancing said unconformed explosive in a first direction, (b) simultaneously oscillating a first portion of said unconformed explosive relative to other portions at a frequency directly related to the speed of advancement of said unconformed explosive and in a direction substantially normal to said first direction whereby a sinusoidal pattern is formed therealong, and (c) permanently attaching a central support means to said formed explosive.

5. The method of claim 4 in which the step of oscillating portions of said unconformed explosive includes uniformly changing the amplitude of said oscillations relative to the speed of advancement.

6. The method of claim 4 in which the step of oscillating portions of said unconformed explosive includes changing the amplitude of said oscillations in stepped increments relative to the speed of advancement.

7. The method of claim 4 in which the step of oscillating portions of said unconformed explosive includes exponentially changing the amplitude of said oscillations relative to the speed of advancement.

8. A method for continuously conforming a linear directional seismic source comprising a length of explosive material formed into a sinusoidal pattern from an unconformed linear form of such material, comprising the steps of:

(a) advancing said unconformed explosive in a first direction, (b) simultaneously oscillating a first portion of said unconformed explosive relative to other portions at a frequency directly related to the speed of advancement of said unconformed explosive and in a direction substantially normal to said first direction whereby a sinusoidal pattern is formed therealong, and (c) permanently attaching said formed explosive between a pair of adhesive tapes having their gummed sides in aligned relationship with each other and the axis of symmetry of said formed explosive.

References Cited
UNITED STATES PATENTS

| | | | |
|---|---|---|---|
| 1,804,916 | 5/1931 | Cotte | 156—440 |
| 2,075,672 | 3/1937 | Stark | 156—440 X |
| 2,993,236 | 7/1961 | Brimley et al. | 86—1 X |

BENJAMIN A. BROCHELT, *Primary Examiner.*

P. A. SHANLEY, G. H. GLANZMAN,
*Assistant Examiners.*